Sept. 5, 1939.   H. M. HOOE   2,171,750
LAWN MOWER
Filed April 22, 1938   3 Sheets-Sheet 1

INVENTOR
*H.M.Hooe*
BY
ATTORNEY

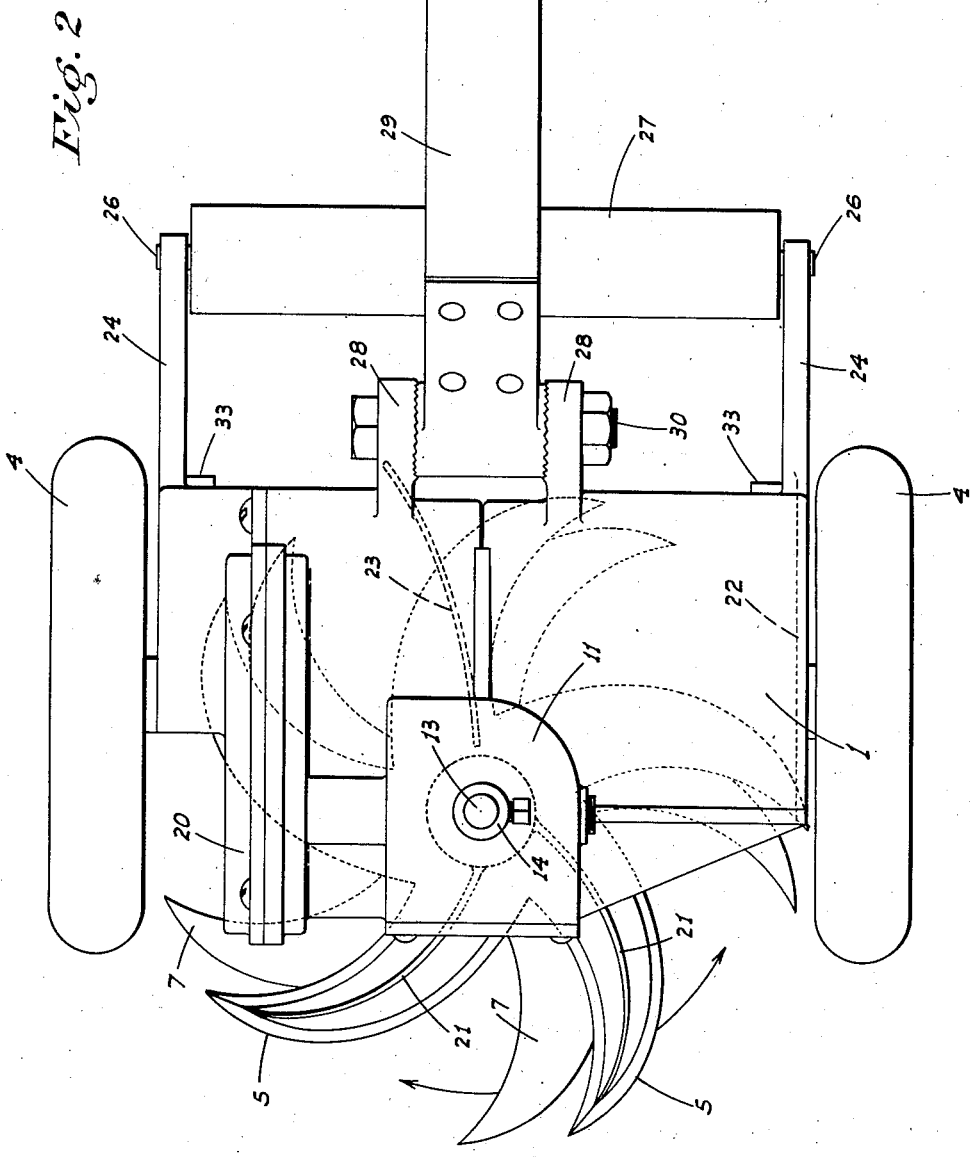

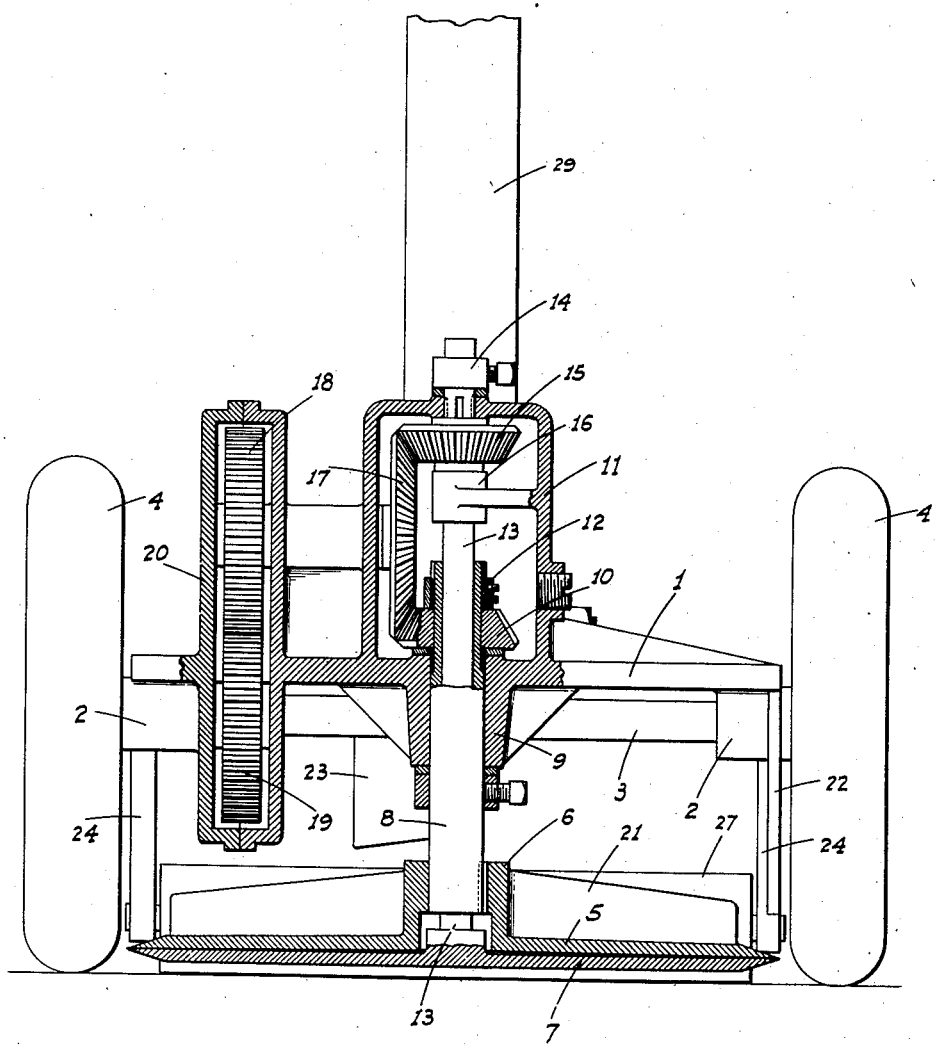

Patented Sept. 5, 1939

2,171,750

UNITED STATES PATENT OFFICE 2,171,750

LAWN MOWER

Harry M. Hooe, Stockton, Calif., assignor of ten per cent to Patrick B. Childress, Stockton, Calif.

Application April 22, 1938, Serial No. 203,576

6 Claims. (Cl. 56—255)

This invention relates to lawn mowers, my principal object being to provide a mower of this general type having a cutter so constructed and arranged as to be self-sharpening, one which will readily and cleanly cut grass of practically any height and toughness, and which will cut very close to posts, trees and the like without any contact of any part of the mower therewith.

A further object is to provide a mower in which the mechanism is made very durable and rugged without excessive weight so that while it is initially designed to be operated by the rotation of the wheels as is common, it can be arranged to be operated by power without any material redesigning or strengthening of the mechanism being required.

These objects I accomplish by means of such structure and relative arrangement of parts as will fully appear by a perusal of the following specification and claims.

In the drawings similar characters of reference indicate corresponding parts in the several views:

Figure 2 is a top plan view of the same.

Figure 3 is a transverse vertical section through the operating mechanism.

Figure 1:
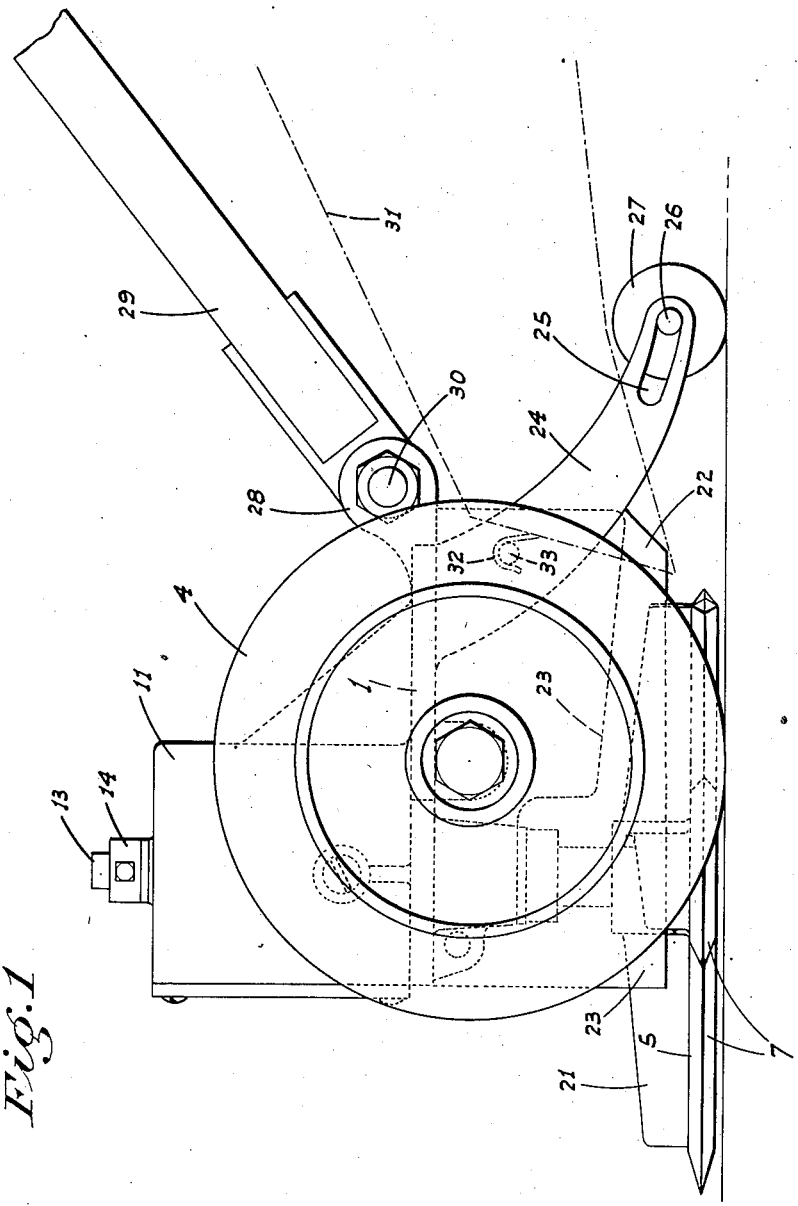
Figure 1 is a side elevation of my improved mower.

Referring now more particularly to the characters of reference on the drawings, the mower comprises a platform or frame base 1 having bearboxes 2 underneath and at its sides for the support of the axle 3 of the wheels 4, which axle is connected to the wheels by the usual differential mechanism.

The cutter instead of being the usual horizontal-axis blade type, is disposed with its axis vertical, and comprises cooperating upper and lower rotary members, the diameter of which is practically the same as the spacing between the wheels. The upper member comprises a plurality of circumferentially spaced cutting fingers 5 radiating from the central hub 6 and shaped with their opposite edges convex and concave respectively, and converging to a point at their outer ends. The upper cutter is arranged to radiate in such a direction that the convex edges of the fingers 5 are the leading edges, and they are of course sharpened. This shape of the cutting fingers gives an efficient shearing action.

The lower cutter member also comprises a number of cutting fingers 7, there being the same number of these fingers as in the upper member, and said fingers being also identical in size and shape as the fingers 5. Since the members, however, rotate in opposite directions as will be seen, the concave edges of the fingers 7 are the sharpened leading edges.

The diameter of the cutting unit relative to the wheel is such that said unit projects some distance in front of the wheels. This enables a cut to be made close to posts, trees and the like without interference from the wheels or without any part of the mower contacting with the posts or other fixed objects.

The hub of the upper cutting member is mounted on a tubular shaft 8 turnable in a bearing sleeve 9 formed on the platform 1 some distance in front of the axle 3. A bevel pinion 10 is splined on the shaft about the platform and is enclosed in a housing 11 rigid with said platform. An axially adjustable thrust collar 12 is mounted on the shaft above and bears on the pinion. The lower cutting member is secured to a shaft 13 which turnably projects through the shaft 8 to a termination above the housing where it is engaged by an axially adjustable thrust collar 14 supported by the top of said housing. By reason of these thrust collars or similar adjustable elements, it will be seen that the cutter supporting shafts may be adjusted independently of each other. In this manner the frictional engagement of the cutting fingers with each other may be altered, wear may be taken up or the cutters may both be raised or lowered so as to set them to operate at different levels relative to the ground.

The shaft 8 terminates within the housing clear of the top of the housing so as to leave a portion of the shaft 13 exposed. A bevel pinion 15 is splined on said exposed portion of the shaft 13 in inverted relation to the pinion 10 and supported against axial movement between the top of the housing and a bearing element 16 therein. The pinions are both engaged by a bevel gear 17 connected to a spur gear 18. while this gear can be attached to a power unit mounted on the platform, I have here shown it as engaged with another spur gear 19 secured on the axle 3, both gears being enclosed in a housing 20 so that they may be kept running in a suitable lubricant.

The upper cutting fingers 5 are provided with upstanding vanes 21 extending from the hub 6 to adjacent the outer ends of the fingers so as to catch the grass as cut and throw the same rearwardly. Such grass is prevented from being thrown against the near wheel by a skirt 22 depending from the adjacent side of the platform, and the grass is also prevented from being carried around to the opposite side of the mower by another depending skirt 23 located substantially to the center of the platform and extending rearwardly from adjacent the hub 6. The grass as thrown back will thus be retained between the wheels and will lie on the ground in the form of a windrow where it may be easily picked up.

Arms 24 depend at a rearward angle from the back of the platform and are longitudinally slotted as at 25 to receive the end shafts 26 of a ground engaging roller 27. The slots extend upwardly from their rear end and their purpose is to facilitate drawing back and tilting the mower upwardly about the roller as an axis when it is desired to raise the cutter at its front end clear of any obstructions in its path.

Formed with the platform at the back are transversely spaced ears 28 between which the roller end of a separating handle 29 projects. A clamping bolt 30 through the ears and handle enables the latter to be set at any angle convenient to the operator. The weight of this handle is designed so as to serve as a counterbalance to the cutter unit and its separating mechanism, the majority of which weight is disposed ahead of the wheel axis.

A grass catching receptacle indicated at 31 may project between the arms 24 and over the roller 27 to a termination close to the path of the cutting unit, so as to receive grass thrown back by the vanes and passing between the skirts 22 and 23. This catcher may be removably supported at its forward end by suitable means such as hooks 32 thereon engaging over pins 33 projecting inwardly from said arms.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A mower comprising spaced supporting wheels, a rotary cutter mounted on a vertical axis between the wheels and adapted to cut in a horizontal plane, said cutter including a plurality of circumferentially spaced cutting fingers, means on the fingers to engage the material as cut and throw the same toward the back of the mower with the rotation of the cutter, a fixed skirt extending lengthwise of the mower adjacent and inwardly of that wheel toward which the cutter turns and depending to adjacent the horizontal plane of the cutter, and another depending skirt extending longitudinally of the mower rearwardly from adjacent and substantially alined with the axis of the cutter.

2. A mower comprising spaced supporting wheels, and a rotary cutter mounted on a vertical axis between the wheels and adapted to cut in a horizontal plane, said cutter comprising cooperating upper and lower cutting members, a tubular shaft upstanding from the upper member, a shaft upstanding from the lower member and projecting through the tubular shaft to a termination above the same, means to adjustably support the shafts against lowering movement, opposed bevel pinions on the shafts adjacent their upper ends and a driven bevel gear engaging both pinions.

3. A mower comprising spaced supporting wheels, and a rotary cutter mounted on a vertical axis between the wheels and adapted to cut in a horizontal plane, said cutter comprising cooperating upper and lower cutting members, a tubular shaft upstanding from the upper member, a shaft upstanding from the lower member and projecting through the tubular shaft to a termination above the same, opposed bevel pinions splined on the shafts adjacent their upper ends, a driven bevel gear engaging the pinions, a structure supported by the wheels and maintaining the pinions against axial movement, an adjustable thrust collar on the tubular shaft supported on the corresponding pinion, and an adjustable thrust collar on the other shaft supported by said structure.

4. A mower comprising a frame structure, spaced wheels supporting said structure, a rotary cutter disposed between the wheels with its axis vertical, said cutter comprising upper and lower cooperating driven cutting members, an upstanding axial shaft on which the lower member is mounted, a tube surrounding said shaft on which the upper member is mounted, means to drive said shaft and tube in opposite directions, means between the shaft and frame structure to adjust the shaft vertically, and separate means between the tube and frame structure to adjust said tube vertically.

5. A mower as in claim 4, in which said driving means includes separate gear elements slidably and non-turnably mounted on the shaft and tube and means between said elements and frame structure maintaining the elements against vertical movement relative to said structure irrespective of adjustment of the shaft and tube.

6. A mower comprising spaced supporting wheels, a rotary cutter mounted on a vertical axis between the wheels and adapted to cut in a horizontal plane, said cutter including a plurality of circumferentially spaced cutting fingers functioning with the rotation of the cutter, means on the fingers to engage the material as cut and throw the same toward the back of the mower, and means mounted on the mower behind the cutter and laterally inward of the wheels to retain the material thus thrown in the form of a windrow lying between the wheels.

HARRY M. HOOE.